(12) United States Patent
Weatherford et al.

(10) Patent No.: US 11,834,527 B1
(45) Date of Patent: Dec. 5, 2023

(54) POLY ALPHA-OLEFINS, COMPOSITIONS THEREOF, AND METHODS OF MAKING

(71) Applicant: Western Performance Chemicals, LLC, Conroe, TX (US)

(72) Inventors: Thomas Michael Weatherford, Magnolia, TX (US); Kevin Michael Weatherford, Conroe, TX (US)

(73) Assignee: Western Performance Chemicals, LLC, Conroe, TX (US)

( * ) Notice: Subject to any disclaimer, the term of this patent is extended or adjusted under 35 U.S.C. 154(b) by 194 days.

(21) Appl. No.: 17/408,455

(22) Filed: Aug. 22, 2021

Related U.S. Application Data

(60) Provisional application No. 63/069,554, filed on Aug. 24, 2020.

(51) Int. Cl.
| | |
|---|---|
| *C08F 10/14* | (2006.01) |
| *C08F 2/01* | (2006.01) |
| *C08F 2/00* | (2006.01) |
| *C08F 2/02* | (2006.01) |

(52) U.S. Cl.
CPC .............. *C08F 10/14* (2013.01); *C08F 2/001* (2013.01); *C08F 2/002* (2013.01); *C08F 2/02* (2013.01)

(58) Field of Classification Search
CPC .......... C08F 2/002; C08F 2/02; C08F 110/00; C08F 10/14
See application file for complete search history.

(56) References Cited

U.S. PATENT DOCUMENTS

| | | | | |
|---|---|---|---|---|
| 4,358,572 A | * | 11/1982 | Mack ...................... | C08F 10/00 507/221 |
| 4,493,904 A | * | 1/1985 | Mack ...................... | C08F 10/00 502/122 |
| 2004/0052690 A1 | * | 3/2004 | Eaton ...................... | B01J 8/0015 526/90 |

FOREIGN PATENT DOCUMENTS

WO    WO-2004076062 A1 *   9/2004    ............ B01J 14/005

* cited by examiner

*Primary Examiner* — Caixia Lu
(74) *Attorney, Agent, or Firm* — Jeffrey L. Streets

(57) ABSTRACT

The present disclosure relates to methods of making poly alpha-olefins and compositions thereof. In some embodiments, a method for making a poly alpha-olefin includes agitating in a first reaction vessel for about 30 seconds or greater a composition comprising a transition metal halide, an electron donor, a co-catalyst, and a $C_4$-$C_{20}$ alpha-olefin. The method includes transferring the composition from the first reaction vessel to a second reaction vessel. The present disclosure further relates to poly alpha-olefins and compositions thereof for reducing drag in the flow of hydrocarbons such as crude oil or refined products in pipes. In at least one embodiment, a composition includes a coated poly alpha-olefin and an inert carrier.

20 Claims, No Drawings

POLY ALPHA-OLEFINS, COMPOSITIONS THEREOF, AND METHODS OF MAKING

FIELD

The present disclosure relates to methods of making poly alpha-olefins and compositions thereof. The present disclosure further relates to poly alpha-olefins and compositions thereof for reducing drag in the flow of hydrocarbons such as crude oil or refined products in pipes.

BACKGROUND

Moving hydrocarbons through transport pipes involves substantial horsepower due to the chemical makeup of the hydrocarbon stream, creating turbulent flow and "drag" through the pipes. Additive compositions can be introduced with the hydrocarbon stream in the pipe to reduce the turbulent flow and reduce "drag". For example, non-crystalline, high molecular weight poly alpha-olefin compositions which are generally hydrocarbon soluble. The poly alpha-olefin compositions, when dissolved in a hydrocarbon fluid flowing through a conduit, reduce turbulent flow and decrease drag, thus reducing the amount of horsepower needed to move a given volume of hydrocarbons, or conversely enable greater volumes of fluid to be moved with a given amount of horsepower. In short, the poly alpha-olefins are drag reducers or flow improvers. The poly alpha-olefin drag reducers display useful flow characteristics not seen with the known crystalline, largely non soluble, artifact-forming polymers such as polyethylene and polypropylene.

In addition, the poly alpha-olefin drag reducers are susceptible to degradation by shear when dissolved in the flowing hydrocarbon in a pipe. Accordingly, pumps or constrictions in the pipe which result in excessive turbulent flow can lead to degradation of the poly alpha-olefin thereby decreasing its effectiveness. Thus, the drag reducing compositions should be introduced into the flowing hydrocarbon stream in a form which achieves certain features. First, the drag reducing compositions should be in a form that is easy to transport and handle without special equipment since injection points for the drag reducing compositions into the flowing hydrocarbon stream are often at remote and inaccessible locations. Secondly, the polymer should be in a form which dissolves rapidly in the hydrocarbon stream flowing in the conduit since the poly alpha-olefins have little drag reducing effect until solubilized in the hydrocarbon stream. In addition, high molecular weight polymers which impart the best-known drag reduction in the flowing hydrocarbon streams are notoriously difficult to dissolve as compositions for shipping to the pipe location. In fact, there is a limitation on polymer content of 40 wt % (based on total composition weight) for current commercial compositions, which also means that a great deal of shipping cost is incurred relative to the active polymer content. Lastly, the very properties that make the high molecular weight poly alpha-olefins effective as drag reducing additives make them difficult to handle since they have a tendency to cold flow or reagglomerate, generally into a sticky mass.

Certain poly alpha-olefins (e.g., for use a drag reducers) may be polymerized in the presence of catalysts to produce high molecular weight non-crystalline hydrocarbon soluble poly alpha-olefins. A number of different commercial approaches have been taken for preparing such poly alpha-olefins. However, methods of forming the poly alpha-olefins result in a gel-like substance which is difficult to introduce into flowing hydrocarbon streams and which becomes extremely viscous and difficult to handle under cold weather temperature conditions at some pipeline injection points. In addition, polymerizations, such as solution polymerizations, used to form the poly alpha-olefins typically take 30 days or more to complete and/or are terminated in a reactor at no more than 20 wt % polymer (based on total reactor content) due to gel formation in the reactor, yielding substantial amounts of unused starting material and poly alpha-olefins having insufficiently low molecular weight.

There is a need for improved poly alpha-olefins, methods of forming poly alpha-olefins, and compositions providing improved drag reduction.

BRIEF SUMMARY

In at least one embodiment, a method for making a poly alpha-olefin includes agitating in a first reaction vessel for about 30 seconds or greater a composition comprising a transition metal halide, an electron donor, a co-catalyst, and a $C_4$-$C_{20}$ alpha-olefin. The method includes transferring the composition from the first reaction vessel to a second reaction vessel.

A method for making a poly alpha-olefin, includes agitating in a first reaction vessel a composition comprising a transition metal halide, an electron donor, a co-catalyst, and a $C_4$-$C_{20}$ alpha-olefin. The method includes transferring the composition from the first reaction vessel to a second reaction vessel, wherein the composition has a viscosity of about 1 cP or greater during the transferring.

In at least one embodiment, a coated poly alpha-olefin includes a poly alpha-olefin having $C_4$-$C_{20}$ alpha-olefin monomeric units, the poly alpha-olefin having an intrinsic viscosity of about 20 dL/g or greater. The coated poly alpha-olefin includes a coating disposed on the poly alpha-olefin. The coating includes a partitioning agent.

In at least one embodiment, a composition includes a coated poly alpha-olefin and an inert carrier.

DETAILED DESCRIPTION

The present disclosure relates to methods of making poly alpha-olefins and compositions thereof. The present disclosure further relates to poly alpha-olefins and compositions thereof for reducing drag in the flow of hydrocarbons such as crude oil or refined products in pipes.

In at least one embodiment, a method for making a poly alpha-olefin includes agitating in a first reaction vessel for about 30 seconds or greater a composition comprising a transition metal halide, an electron donor, a co-catalyst, and a $C_4$-$C_{20}$ alpha-olefin. The method includes transferring the composition from the first reaction vessel to a second reaction vessel.

A method for making a poly alpha-olefin, includes agitating in a first reaction vessel a composition comprising a transition metal halide, an electron donor, a co-catalyst, and a $C_4$-$C_{20}$ alpha-olefin. The method includes transferring the composition from the first reaction vessel to a second reaction vessel, wherein the composition has a viscosity of about 1 cP or greater during the transferring.

In at least one embodiment, a method for making a poly alpha-olefin includes introducing a transition metal halide with an electron donor to form a first composition. The method includes introducing a co-catalyst with a $C_4$-$C_{20}$ alpha-olefin monomer to form a second composition. The method includes introducing the first composition with the second composition to form a third composition and agitating in a first reaction vessel the third composition. The method includes transferring the third composition from the first reaction vessel to a second reaction vessel.

In at least one embodiment, a coated poly alpha-olefin includes a poly alpha-olefin having $C_4$-$C_{20}$ alpha-olefin monomeric units, the poly alpha-olefin having an intrinsic viscosity of about 20 dL/g or greater. The coated poly alpha-olefin includes a coating disposed on the poly alpha-olefin. The coating includes a partitioning agent. In at least one embodiment, a composition includes a coated poly alpha-olefin and an inert carrier.

It has been discovered that (1) agitating (e.g., stirring) for a period of time in the first reactor builds viscosity of the composition of the first reactor so the catalyst does not settle once the composition is then transferred to a second (e.g., static) reaction vessel, and (2) the dimensions (e.g., height, width, length) of the second reaction vessel prevents the catalyst from settling in the second reaction vessel. Such conditions can provide ultra-high molecular weight poly alpha-olefins formed at a very fast rate of reaction and having advantageous properties, e.g., when used as a drag reducing agent.

In addition to providing new and improved poly alpha-olefins, methods of the present disclosure provide increased manufacturing throughput of ultra-high molecular weight poly alpha-olefins. For example, conventional polymerizations of high molecular weight poly alpha-olefins takes 30 days or more under conventional polymerization conditions, whereas polymerization of ultra-high molecular weight poly alpha-olefins of the present disclosure may be accomplished in about 15 days or less. In addition, product compositions of the present disclosure may have a higher content of poly alpha-olefin, as compared to conventional compositions, providing improved economics of transportation and handling of product compositions of the present disclosure.

Methods of Making Poly Alpha-Olefins

The present disclosure provides methods of making poly alpha-olefins. Poly alpha-olefins of the present disclosure can be prepared by solution polymerization or bulk polymerization. A solution or bulk polymerization can be carried out using any suitable olefin polymerization catalyst, such as a Ziegler-Natta catalyst. In at least one embodiment, poly alpha-olefins can be prepared by bulk polymerization.

In some embodiments, a method for making a poly alpha-olefin includes agitating in a first reaction vessel, for about 30 seconds or greater, a composition including a transition metal halide, an electron donor, a co-catalyst, and a $C_4$-$C_{20}$ alpha-olefin. The method includes transferring the composition from the first reaction vessel to a second reaction vessel.

In some embodiments, a method for making a poly alpha-olefin includes agitating in a first reaction vessel a composition including a transition metal halide, an electron donor, a co-catalyst, and a $C_4$-$C_{20}$ alpha-olefin. The method includes transferring the composition from the first reaction vessel to a second reaction vessel, wherein the composition has a viscosity of about 1 cP or greater during the transferring.

In at least one embodiment, the catalysts can be prepared under an inert anhydrous atmosphere (e.g., nitrogen or argon). In addition, catalysts can be prepared in the presence of alpha-olefin monomers (used to form the poly alpha-olefins). For example, alpha-olefins can be dried using molecular sieves and/or cooled to a temperature of about −25° C. to about 0° C. A co-catalyst is introduced with the alpha-olefins (e.g., a temperature of about −25° C. to about 0° C.). The catalysts are further prepared by introducing a transition metal halide with an electron donor selected from an ether, an ester, an amine, a phosphine, a piperidine, a phosphite, a phosphate, a pyridine, a sulfide, or combination(s) thereof. For example, preparing the catalyst can include (1) introducing the transition metal halide (of the general formula $MX_t$, where M is titanium or vanadium, and t is 2, 3, or 4, and X is a halogen) with (2) at least 1 electron donor selected from an ether, ester, amine, phosphine, piperidine, phosphite, phosphate, pyridine, sulfide, or combination(s) thereof, (3) then introducing the product of (1) with (2), with the co-catalyst/olefin composition, the co-catalyst including an organoaluminum or organoaluminum halide of the formula $AlR_nX_{3-n}$, where R is hydrocarbyl containing from 1 to 20 carbon atoms, X is halogen, siloxide, or alkoxide and n is 1 or 2. In some embodiments, a transition metal halide is $TiCl_3$, an electron donor is di-n-butyl ether, and/or the co-catalyst is diethyl aluminum chloride.

In some embodiments, a mole ratio of co-catalyst to electron donor to transition metal halide can be from about 1/0.01/1 to about 15/5/5, respectively, such as about 3/0.5/1. In some embodiments, a mole ratio of electron donor to co-catalyst is about 0.01/1 to about 1/1.

The catalyst can be prepared as a slurry, using a hydrocarbon diluent. For example, a hydrocarbon diluent can be introduced to one or more of the compositions or components described above. Polymerizations may be performed in the presence of a hydrocarbon diluent. Hydrocarbon diluents are inactive hydrocarbon solvents with respect to the polymerization. Examples of such materials are straight chain aliphatic compounds or branched hydrocarbons such as propane, butane, pentane, hexane, heptane or octane. Also suitable are alicyclic hydrocarbons such as cyclohexane, methyl cyclopentane and tetralin. In addition, aromatic hydrocarbons can be used such as benzene, toluene, and xylene. Alternatively, the catalyst is prepared and/or the polymerization is performed in the absence of hydrocarbon diluent (e.g., a bulk polymerization is performed). The absence of hydrocarbon diluent is advantageous because ultra-high molecular weight poly alpha-olefins tend to bundle/comingle with themselves and each other upon formation, effectively trapping diluent and hindering subsequent drying of the poly-alpha olefins.

Electron donors are materials which activate the catalyst. In embodiments of the present disclosure, the electron donors are weak to moderately strong Lewis bases. An electron donor may be an ether, amine, phosphine, piperidine, phosphite, phosphate, pyridine, ester, sulfide, or combination(s) thereof.

An ether can be selected from alkyl ethers where ether oxygen is attached directly to two aliphatic groups and may have aromatic substituents; aryl ethers where the ether oxygen is attached directly to two aromatic groups; aryl alkyl ethers where the ether oxygen is attached directly to one aliphatic and one aromatic group; and cyclic ethers where the ether oxygen is a ring atom of a ring structure. The ether can therefore contain alkyl, aryl, aryl alkyl, or alkyl aryl groups, each independently containing from 2 to 30 carbon atoms. An ether can be used at modifier to transition metal molar ratios of about 1:1 to about 10:1.

An alkyl ether may be dimethyl ether, benzyl ether, tert-butyl methyl ether, di-n-butyl ether, diisopropyl ether, di-n-propyl ether, or combination(s) thereof. A cyclic ether may be cyclododecene oxide, cyclohexene oxide, cyclooctene oxide, cyclopentene oxide, dibenzylfuran, dihydropyran, furan, 2-methylfuran, 3-methylfuran, 2-methyltetrahydrofuran, 3-methyltetrahydrofuran, styrene oxide, tetrahydrofuran, or combination(s) thereof. An aryl ether may be m-phenoxytoluene, phenyl ether, or combination(s) thereof.

An aryl alkyl ether may be anisole, butyl phenyl ether, m-dimethoxybenzene, p-dimethoxybenzene, 2,6-dimethoxytoluene, 1-methoxynaphthalene, 2-methoxynaphthalene, or combination(s) thereof.

An amine may be tri-n-butyl amine, diisopropyl ethyl amine, dibutyl amine, trimethyl amine, tri-n-propyl amine, tri-i-propyl amine, tribenzyl amine, tri(4-methyl phenyl) amine, triphenyl amine, dimethyl phenyl amine, di-sec-butyl benzyl amine, ethyl propyl phenyl amine, diisopropyl ethyl amine, diisopropyl amine, di-n-butyl amine, dibenzyl amine, diphenyl amine, benzyl methyl amine, benzyl phenyl amine, n-butyl-1-propyl amine, or combination(s) thereof. An amine can be used in amine to transition metal mole ratios of about 1:1 to about 5:1.

A phosphine may be tributyl phosphine, trioctyl phosphine, trimethyl phosphine, triphenyl phosphine, dibenzyl phenyl phosphine, diphenyl butyl phosphine, dioctyl benzyl phosphine, dihexyl methyl phosphine, di-cyclo-pentyl ethyl phosphine, hexyl methyl-1-propyl phosphine, ethyl (2-phenyl ethyl) phenyl phosphine, or combination(s) thereof. A phosphine can be used in phosphine to transition metal mole ratios of about 1:1 to about 3:1.

A phosphate may be tributyl phosphate, dimethyl octyl phosphate, diphenyl propyl phosphate, di-s-butyl benzyl phosphate, trioctyl phosphate, tribenzyl phosphate, decyl ethyl phenyl phosphate, or combination(s) thereof. A phosphate can be used in phosphate to transition metal mole ratios of about 1:1 to about 3:1.

A piperidine may be 2,2,6,6-tetramethyl piperidine, 3,3,5,5-tetraethyl piperidine, 2,2,6-tri-n-butyl piperidine, 2,6-diphenyl-2,6-dimethyl piperidine, 2,6-dibenzyl-2,6-diethyl piperidine, 2,6-dioctyl piperidine, 2,6-diphenyl piperidine, or combination(s) thereof. A piperidine can be used in piperidine to transition metal mole ratios of about 1:1 to about 3:1.

A sulfide may be n-hexyl sulfide, n-butyl sulfide, sec-butyl sulfide, n-decyl sulfide, di(2-phenyl propyl)sulfide, phenyl-1-octyl sulfide, benzyl methyl sulfide, phenyl sulfide, (4-methyl phenyl)sulfide, or combination(s) thereof. A sulfide can be used in sulfide to transition metal mole ratios of about 1:1 to about 3:1.

A phosphite can be tri-n-propyl phosphite, tri-n-butyl phosphite, tri-i-octyl phosphite, di-s-butyl-n-decyl phosphite, dibenzyl-n-hexyl phosphite, diphenyl-1-heptyl phosphite, diethyl phenyl phosphite, benzyl methyl phenyl phosphite, cyclo-pentyl ethyl octyl phosphite, or combination(s) thereof. A phosphite can be used in phosphite to transition metal mole ratios of about 1:1 to about 3:1.

As described above, alpha-olefin monomers are used for making the poly alpha-olefins. An alpha-olefin monomer can contain from 4 to 20 carbon atoms, such as 8 to 12 carbon atoms, such as 10 carbon atoms. An alpha-olefin can be 1-butene, 1-pentene, 4-methyl-1-pentene, 1-octene, 1-decene, 1-dodecane, 1-hexene, 1-octadecene, or combination(s) thereof. In some embodiments, an alpha-olefin is 1-octene, 1-decene, 1-dodecene, or combination(s) thereof. The alpha-olefins can be substantially all of the alpha-olefin monomers used in a polymerization. Alternatively, the alpha-olefins can be utilized with other ethylenically unsaturated monomers such as butadiene, pentadiene, styrene, isoprene, alpha-methylstyrene, or combination(s) thereof.

The composition of the alpha-olefin and catalyst is agitated (e.g., stirred) in a first reaction vessel (such as a stir tank reactor, a line, and/or in-line mixer) for about 30 seconds or more, such as about 2 minutes to about 15 minutes, such as about 4 minutes to about 12 minutes, such as about 6 minutes to about 11 minutes, such as about 7 minutes to about 10 minutes, such as about 7.5 minutes to about 8.5 minutes, such as about 8 minutes, after which the composition is transferred to a second reaction vessel that is a static reaction vessel (e.g., a reaction vessel that does not actively agitate the composition with, for example, a stir blade). The composition can have a viscosity of about 1 cP or greater during the transferring, such as about 2 cP or greater, such as about 3 cP or greater, such as about 1 cP to about 10 cP, such as about 3 cP to about 8 cP. For example, the first reaction vessel can be a stainless-steel reactor configured to agitate (e.g., stir) the composition, and the second reaction vessel can be a bottle or bag, such as a Mylar™ bag available from DuPont de Nemours, Inc.

A concentration of catalyst (based on transition metal content) in the composition of the alpha-olefin and the catalyst can be about 1 ppm to about 200 ppm, such as about 20 ppm to about 150 ppm, such as about 75 ppm to about 125 ppm. The concentration of catalysts in the first reaction vessel and the second reaction vessel can be substantially the same. Concentration of catalysts depends upon the dimensions of the reaction vessels, which is most likely related to higher temperatures which in turn results from the size of the reaction vessel. Cooling can compensate for differences in catalyst concentration to some degree. In bulk polymerization systems, catalysts are used typically at a concentration of 3500 moles alpha-olefin monomer per mole transition metal halide in the catalyst, although ratios can vary from about 500:1 to about 10,000:1 or more. Catalyst concentration affects rate of reaction and temperature as well as molecular weight.

Ziegler-Natta catalysts can be sensitive to oxygen and water. Accordingly, the reaction vessels used should be made of materials which are capable of excluding air and water from the composition during the time reactions are taking place. Such materials include metals (e.g., stainless steel) and/or barrier polymers. Barrier polymers can be crystalline and can be non-soluble in hydrocarbons in which the poly alpha-olefins are soluble at ambient conditions, such as crude oil or refined products. Cross-linking may be present in these barrier polymers.

In some embodiments, a first reaction vessel is a stainless-steel reactor configured to agitate (e.g., stir) the composition of the catalyst and the alpha-olefin. In some embodiments, a first reaction vessel has a volume of about 1 gallon to about 5,000 gallons. In at least one embodiment, a first reaction vessel is a 1500-gallon jacketed agitated stainless-steel reactor.

In some embodiments, a first reaction vessel is an in-line mixer. Agitation may be performed using any suitable agitator, such as one or more mechanical stirrers disposed within the reaction vessel, static mixing, or ultrasonic mixing.

In some embodiments, a second reaction vessel is a bottle or bag made of a polyester that is a polyethylene terephthalate. In some embodiments, a polyethylene terephthalate is a biaxially-oriented polyethylene terephthalate.

In some embodiments, a second reaction vessel can be a bottle or bag containing 5 to 7 layers, including a water impervious polyolefin such as polypropylene, polyethylene, polybutylene, a bonding polymer, and ethylene vinyl alcohol copolymer oxygen barrier, another bonding polymer, and externally coated with polyethylene, polypropylene, polybutylene, or polyethylene. Ethylene vinyl alcohol copolymer is an excellent oxygen barrier but a poor water barrier, while polyethylene, polypropylene, polybutylene, and the like are excellent water barriers, but do not permit the passage of oxygen. As the barrier materials typically do not have good mutual adhesion, a polymer that can adhere to both can be disposed between the barrier materials.

Ethylene vinyl alcohol also has better oxygen barrier properties when dry, and placing the ethylene vinyl alcohol layer interior to the water resistant exterior polyolefin materials enhances its oxygen barrier effectiveness. A function of the polyolefin layer adjacent to the reaction mixture is to protect the catalyst from the functional groups on the ethylene vinyl alcohol copolymer.

Although the foregoing reaction vessel materials may be used, it is apparent that any suitable substitution of one or more of the materials can be made. For example, some nylons and polyesters have adequate oxygen barrier properties. Most thermo-plastic, crystalline polyolefins could replace those mentioned for forming the bottles and bags. However, for cost-effectiveness and readily available materials, the ones specifically mentioned might be preferred, although there is no technical reason not to substitute other materials capable of similar performance.

A second reaction vessel can have a flat geometry with high surface area, which has been found to promote the rate of polymerization. In some embodiments, a second reaction vessel has a length of about 10 ft to about 20 ft, such as about 14 ft to about 18 ft, such as about 16 ft. A second reaction vessel can have a width of about 1 ft to about 5 ft, such as about 2 ft to about 4 ft, such as about 3 ft. A second reaction vessel can have a height of about 0.1 ft to about 2 ft, such as about 0.5 ft to about 1 ft, such as about 0.5 ft. In some embodiments, a second reaction vessel can have a ratio of length to width of about 1:1 to about 10:1, such as about 3:1 to about 8:1, such as about 5:1. A second reaction vessel can have a ratio of length to height of about 10:1 to about 50:1, such as about 20:1 to about 40:1, such as about 30:1. A second reaction vessel can have a ratio of width to height of about 1:1 to about 15:1, such as about 3:1 to about 8:1, such as about 6:1.

In some embodiments, a first reaction vessel and/or second reaction vessel (such as a bottle or bag) can be disposed on or in a cooling vessel. A cooling vessel can be a cooling bath or a metal tray that is chilled using any suitable cooling device. Use of a cooling vessel can indirectly control the temperature of the composition present in the second reaction vessel. In addition, air flow can be provided around the first reaction vessel and/or second reaction vessel to remove heat produced by polymerization occurring within the first reaction vessel or second reaction vessel, respectively, that emanates from the first reaction vessel and/or second reaction vessel.

The first reaction vessel is fluidly coupled with the second reaction vessel. In some embodiments, the first reaction vessel is fluidly coupled with the second reaction vessel via one or more conduits. After a desired time of agitation, the agitation of the first reaction vessel may be stopped. A pressure (e.g., via inert gas flow (e.g., nitrogen or argon)) can be applied to the first reaction vessel such that the composition in the first reaction vessel is flowed through the one or more conduits to the second reaction vessel. For example, an inert gas flow can be increased to a flow rate that is higher than an inert gas flow rate used during the agitation of the composition. A first valve can be present at a first portion (e.g., end) of a conduit, and a second valve can be present at a second portion of the conduit. The first portion can be coupled with the first reaction vessel, and the second portion can be coupled with the second reaction vessel. When the first valve and the second valve are in an open position, the composition can be flowed through the conduit to the second reaction vessel.

It has been discovered that (1) agitating (e.g., stirring) for a period of time in the first reactor builds viscosity of the composition so the catalyst does not settle once in a second (static) reaction vessel, and (2) the dimensions (e.g., a height of 1 foot or less) of the second reaction vessel prevents the catalyst from settling in the second (static) reaction vessel. Such conditions can provide ultra-high molecular weight poly alpha-olefins formed at very fast rate of reaction and having advantageous properties, e.g., when used as a drag reducing agent.

For example, it was discovered that stirring the composition in the first reaction vessel for 4 minutes (before transferring the composition to the second reaction vessel) made viscosity of the composition increase a lot faster versus stirring the composition for only 2 minutes. If stirring the composition for 8 minutes, the amount of polymer formed is substantial, and, after transfer into the second reaction vessel, 90 percent solids can be obtained in about 8 days (as opposed to 30 days of conventional polymerizations in a single reaction vessel). Without being bound by theory, it is believed that in the first 8 minutes of agitation, the agitation is inhibiting bundling/comingling of the poly alpha-olefin that is formed, thereby dispersing catalyst better in the composition, and likely affecting the molecular weight distribution of ultra-high molecular weight poly alpha-olefins that are ultimately formed. In comparison, if agitation of the composition in the first reactor is performed for 30 seconds and then sent to a (static) second reaction vessel, the polymerization would still take 30 days to complete where the product would have 90 wt % solids and the poly alpha-olefin product would have a different chemical composition than the poly alpha-olefin product formed with the 8-minute agitation. In addition, if the composition is agitated for too long of a time in the first reaction vessel, the viscosity will become so thick that the reactor contents cannot be removed (whether by conduit or otherwise) necessitating reactor shutdown.

Conditions in the first reaction vessel and the second reaction vessel can include (1) a temperature, independently, of about −25° C. to about 80° C. (such as about −10° C. to about 40° C.) and (2) a pressure, independently, of about ambient pressure to about 1,000 psig.

After a polymerization in the second reaction vessel is complete, the ultra-high molecular weight poly alpha-olefin product can be removed from the second reaction vessel. For example, if the second reaction vessel is a bottle or bag, the material of the bottle or bag can be removed (e.g., peeled away) from the poly alpha-olefin product. It has been discovered that ultra-high molecular weight poly alpha-olefins can be formed utilizing methods of the present disclosure. For example, the product obtained from the second reaction vessel can have 75 wt % or greater content of ultra-high molecular weight poly alpha-olefin @ 7 days of total polymerization, such as 80 wt % or greater @ 8 days of total polymerization, such as 85 wt % or greater @ 9 days of total polymerization, such as 90 wt % or greater @ 9 days of total polymerization. Ultra-high molecular weight poly alpha-olefin content of the product from the second reaction vessel can be determined by (1) determining the solids content of the product using the method described herein, and then (2) determining the average molecular weight using the four-bulb shear dilution viscometer and procedure described herein. Solids content of the product can be determined by removing some material from the second reaction vessel, weighing the material, heating the material to remove monomer and other volatiles, and reweighing the material. In addition to providing new and improved poly alpha-olefins, methods of the present disclosure provide increased manufacturing throughput of ultra-high molecular weight poly alpha-olefins. For example, conventional polymerizations of high molecular weight poly alpha-olefins (much less ultra-high molecular weight poly alpha-olefins) takes 30 days or more under conventional polymerization conditions.

Poly Alpha-Olefins

Poly alpha-olefins contain monomeric units that are independently from 4 to 20 carbon atoms, such as 8 to 12 carbon atoms, such as 10 carbon atoms. For example, monomeric units can be (i.e., are derived from polymerization of) 1-butene, 1-pentene, 4-methylpentene, 1-octene, 1-decene, 1-dodecane, 1-hexene, 1-octadecene, or combination(s) thereof. Poly alpha-olefins can also have other ethylenically unsaturated monomeric units such as butadiene, pentadiene, styrene, isoprene, alpha-methylstyrene, or combination(s) thereof. In some embodiments, a poly alpha-olefin has 90 wt % or greater monomeric units that are 1-octene, 1-decene, 1-dodecene, and combination(s) thereof. In some embodiments, a poly alpha-olefin has 95 wt % or greater monomeric units that are 1-octene, 1-decene, 1-dodecene, and combination(s) thereof. In some embodiments, a poly alpha-olefin has 99.9 wt % or greater monomeric units that are 1-octene, 1-decene, 1-dodecene, and combination(s) thereof. In some embodiments, a poly alpha-olefin has 99.9 wt % or greater monomeric units that are 1-decene.

The molecular weight of the poly alpha-olefin formed is very high and techniques used to measure molecular weight of current commercial products cannot be used for the resultant product. However, intrinsic viscosity measurement can be utilized as an indirect measurement of molecular weight. Accordingly, inherent viscosity can be determined for poly alpha-olefins using a Cannon Ubbelohde four-bulb shear dilution viscometer and a procedure to accommodate the ultra-high molecular weight (0.05 grams poly alpha-olefin/per 100 milliliters hexane solvent at 25° C.). Inherent viscosities are calculated for each of the last three bulbs (the high shear rate bulb is discounted because of excessive shear thinning) and plotted as a function of average shear rate. The plot is then used to obtain an inherent viscosity at a shear rate of 300 seconds$^{-1}$. In some embodiments, a poly alpha-olefin has an intrinsic viscosity of about 20 dL/g or greater, such as about 25 dL/g to about 40 dL/g, such as about 30 dL/g to about 40 dL/g, alternatively about 25 dL/g to about 30 dL/g.

As determined using the four-bulb method described above, a poly alpha-olefin has an average molecular weight of about 15 million to about 30 million, such as about 18 million to about 25 million, such as about 20 million.

Product Compositions

The poly alpha-olefin obtained from the second reaction vessel can be dried to remove volatiles (such as remaining alpha-olefin monomers and/or diluent). For example, the poly alpha-olefin can be dried in an oven at a temperature of about 100° F. to about 200° F., such as about 160° F.

The dried poly alpha-olefin can be ground using any suitable grinding process to produce a fine powder. Any suitable grinder may be used, such as an impact mill, rod mill, or ball mill. For example, the fine powder of poly alpha-olefin can have a size of (about ¼" to about ½") by (about ⅛" to about ¾"), such as about ⅜" by ¼". The size of the particles of the powder does not affect ultimate performance of the poly alpha-olefin as a drag reducing agent. However, an advantage of the size of the particles of the fine powder is that the particles will freeze more readily in a subsequent cryogenic freezing (e.g., described below) because the available surface area of the poly alpha-olefin has been increased (versus surface area before grinding) and provides higher throughput of the cryogenic freezing, as compared to that of poly alpha-olefin that has not been ground to a fine powder.

While the poly alpha-olefin is being ground to produce a fine powder, a partitioning agent is also introduced with the poly alpha-olefin (e.g., partitioning agent introduced to the grinder) to coat the poly alpha-olefin and produce a coated poly alpha-olefin. A poly alpha-olefin can be partially or entirely coated with the partitioning agent to form the coated poly alpha-olefin. A partitioning agent substantially inhibits the newly created powder particles from agglomerating with one another. In some embodiments, a coated poly alpha-olefin has a partitioning agent content of about 0.1 wt % to about 40 wt %, such as about 0.1 wt % to about 25 wt %, such as about 15 wt % to about 20 wt %, such as about 18 wt %, based on the weight of poly alpha-olefin+partitioning agent of the coated poly alpha-olefin. In some embodiments, a coated poly alpha-olefin has a poly alpha-olefin content of about 60 wt % to about 99.9 wt %, such as about 75 wt % to about 99.9 wt %, such as about 80 wt % to about 75 wt %, such as about 82 wt %, based on the weight of poly alpha-olefin+partitioning agent of the coated poly alpha-olefin.

In some embodiments, a partitioning agent is a wax, alumina, calcined clay, talc, carbon black, calcium stearate, magnesium stearate, or combination(s) thereof. In at least one embodiment, a partitioning agent is calcium stearate.

Before being introduced with the poly alpha-olefin, the partitioning agent can be ground using any suitable grinding process to produce a fine powder of partitioning agent. For example, the fine powder of partitioning agent can have a size of (about ¼" to about ½") by (about ⅛" to about ¾"), such as about ⅜" by ¼". Fine powder of partitioning agent provides less amount of partitioning agent used to coat the poly alpha-olefin (as compared to partitioning agent that has not been ground). A lower partitioning agent content of the coated poly alpha-olefin provides reduced viscosity of the overall product composition (as compared to a product composition having a higher content of partitioning agent).

The coated poly alpha-olefin can be removed from the grinder and is cooled at a temperature (e.g., cryogenically frozen using liquid nitrogen) of about −275° F. to about −150° F., such as about −250° F. to about −200° F., such as about −250° F. The coated poly alpha-olefin at a low temperature is then further ground into a second fine powder using any suitable grinding process. For example, the coated poly alpha-olefin can be introduced to a milling device, such as a high-speed hammer mill, and milled into a second fine powder (e.g., a powder that is finer than the powder described above).

The second fine powder is then dispersed in an inert carrier to form a product composition. An inert carrier can be an oil, such as an animal oil, vegetable oil, natural oil, synthetic oil, hydrocarbon oil, silicone oil, or combination(s) thereof. An oil may be a soybean oil, mineral oil, squalene oil, argan oil, canola oil, coconut oil, corn oil, cottonseed oil, flaxseed oil, grape seed oil, mustard oil, olive oil, palm oil, palm kernel oil, peanut oil, pine seed oil, poppy seed oil, pumpkin seed oil, rice bran oil, safflower oil, tea oil, truffle oil, vegetable oil, apricot (kernel) oil, grapeseed oil, macadamia oil, wheat germ oil, almond oil, rapeseed oil, gourd oil, sesame oil, hazelnut oil, maize oil, sunflower oil, hemp oil, avocado oil, walnut oil, fish oil, berry oil, or combination(s) thereof. In at least one embodiment, an inert carrier is a soybean oil.

In some embodiments, a product composition of the present disclosure can have a high content of coated poly alpha-olefin, which is advantageous for shipping of the product composition because the drag reducing agent (the poly alpha-olefin) is present in the composition in a high amount. Conventional compositions having a drag reducing agent typically have low amounts of drag reducing agent due to the drag reducing agent's tendency to agglomerate. For example, a product composition of the present disclosure can have a coated poly alpha-olefin content of about 30 wt % or greater, such as about 30 wt % to about 80 wt %, such as about 35 wt % to about 60 wt %, such as about 35 wt % to about 50 wt %, such as about 40 wt %, based on weight of the product composition. In some embodiments, a product composition of the present disclosure has an inert carrier content of about 20 wt % to about 70 wt %, such as about 40 wt % to about 65 wt %, such as about 50 wt % to about 65 wt %, such as about 60 wt %, based on weight of the product composition.

Use of Poly Alpha-Olefins and Product Compositions Thereof

A poly alpha-olefin, coated poly alpha-olefin, or product compositions thereof of the present disclosure may be used for any suitable end use. For example, a poly alpha-olefin, coated poly alpha-olefin, or product composition thereof is used as a drag reducing agent by introducing the poly alpha-olefin, coated poly alpha-olefin, or composition thereof into a pipeline.

Product compositions of the present disclosure can be introduced to a pipeline containing hydrocarbons without any special equipment adapted for the purpose of injecting the product composition. Generally, a product composition can be introduced to the flowing hydrocarbon by continuous injection by proportioning pumps situated at desired locations along the pipeline. For example, a composition can be introduced at a pump station of a pipeline. Pump stations are typically 50 miles apart from one another along a pipeline. A pump station typically destroys conventional drag reducing agents, so, in an abundance of caution, a composition of the present disclosure may be introduced at one or more (e.g., each) pump station along the pipeline of interest.

The operators of the pumps/pipelines can make performance curves based on the particular hydrocarbon (e.g., crude oil) being pumped through the pipeline. For example, the operators can test variable injection rates of the composition into the pipeline at a pump station. If providing the composition to the pipeline makes the pressure of the pipeline go down, an increased flow rate of hydrocarbon through the pipeline can be determined. The increased flow rate can be used to flow hydrocarbon through the pipeline at the original pressure used for flow of the hydrocarbon, or a desired pressure different than the original pressure may be used. In some embodiments, the hydrocarbon is a crude oil, gas oil, diesel oil, fuel oil, refined liquid hydrocarbon stream, asphaltic oil, or combination(s) thereof.

The amount of the poly alpha-olefin present in a pipeline can be expressed as ppm (parts by weight of poly alpha-olefin per million parts by weight of pipeline hydrocarbon). The amount of a poly alpha-olefin used to produce a desired drag reduction can vary depending upon the physical properties and composition of the pipeline hydrocarbon. Accordingly, a desired drag reduction may be obtained by addition of as little as two ppm or less of the poly alpha-olefin to the pipeline hydrocarbon. Conversely, some high viscosity fluids may utilize 1,000 ppm of poly alpha-olefin or greater to achieve a desired drag reduction. Generally, a pipeline hydrocarbon has about 2 ppm to about 1,000 ppm, such as about 2 ppm to about 500 ppm, such as about 1 ppm to about 100 ppm poly alpha-olefin content.

The property of ultra-high molecular weight renders a poly alpha-olefin of the present disclosure difficult to process due to its high viscosity and melting point. However, the property of ultra-high molecular weight is desirable in other applications. Poly alpha-olefins having ultra-high molecular weight have the capacity to reduce drag in pumpable fluids. At a given rate, the percent drag reduction is defined as a change of pressure in the line with and without the ultra-high molecular weight poly alpha-olefin, as set forth in the equation below.

$$\text{Drag Reduction} = (\Delta P - \Delta Pr)/\Delta P \times 100$$

where $\Delta P$ is the pressure drop of the transported hydrocarbon fluid, $\Delta Pr$ is the delta drop of the polymer solution. Thus, it is apparent that a high molecular weight poly alpha-olefin has a greater capacity to influence the turbulent flow in the pipeline than a polymer of low molecular weight.

Drag reduction measurements can be made using a constant speed pipe viscometer including: an Ingersoll-Rand 3,455 r.p.m., MCS size, gallon per minute centrifugal pump; a seven foot long test section of 0.305 inch inside diameter stainless steel tubing; two pressure gauges ranging from 30 ounces per square inch to 30 pounds per square inch pressure, one positioned two feet from the tube entrance and the other positioned one foot from the tube outlet; 100 pound grease buckets for volume and weighing tanks and scales for determining the mass flow rate. A flow rate of approximately 7 gallons per minute can be used, resulting in a velocity and a Reynolds number with diesel oil test fluid. The measurements can be carried out by adding 2½ gallons of diesel oil to one of the tanks of the pipe viscometer, measuring the pressure drop of the diesel oil, i.e., the difference in the pressure as shown on the two gauges, and then measuring the pressure drop as the product composition is added. The product composition can be first diluted in either diesel oil or Decalin at a concentration of 1 percent. The pressure drop measurements can be taken 10 minutes after the diluted solution is added. The percent drag reduction is calculated as shown in the equation above.

In some embodiments, a poly alpha-olefin can provide a % drag reduction of greater than 30%, such as about 30% to about 70%, such as about 40% to about 55%, such as about 50% to about 70%, such as about 55% to about 65%, alternatively about 80% or greater, such as 90% or greater.

ADDITIONAL ASPECTS

The present disclosure provides, among others, the following aspects, each of which may be considered as optionally including any alternate aspects.

Clause 1. A method for making a poly alpha-olefin, comprising:
  agitating in a first reaction vessel for about 30 seconds or greater a composition comprising a transition metal halide, an electron donor, a co-catalyst, and a $C_4$-$C_{20}$ alpha-olefin; and
  transferring the composition from the first reaction vessel to a second reaction vessel.

Clause 2. A method for making a poly alpha-olefin, comprising:
agitating in a first reaction vessel a composition comprising a transition metal halide, an electron donor, a co-catalyst, and a $C_4$-$C_{20}$ alpha-olefin; and
transferring the composition from the first reaction vessel to a second reaction vessel, wherein the composition has a viscosity of about 1 cP or greater (such as about 3 cP or greater) during the transferring.

Clause 3. The method of any of Clauses 1 or 2, wherein agitating the composition is performed for about 6 minutes to about 11 minutes before introducing the composition to the second reaction vessel.

Clause 4. The method of any of Clauses 1 to 3, wherein agitating the composition is performed for about 7.5 minutes to about 8.5 minutes.

Clause 5. The method of any of Clauses 1 to 4, wherein the second reaction vessel is a static reaction vessel.

Clause 6. The method of any of Clauses 1 to 5, wherein the second reaction vessel is a bag comprising polyethylene terephthalate.

Clause 7. The method of any of Clauses 1 to 6, wherein the second reaction vessel has:
a length of about 10 ft to about 20 ft,
a width of about 1 ft to about 5 ft, and
a height of about 0.1 ft to about 2 ft.

Clause 8. The method of any of Clauses 1 to 7, wherein the second reaction vessel has:
a ratio of length to width of about 3:1 to about 8:1,
a ratio of length to height of about 20:1 to about 40:1, and
a ratio of width to height of about 3:1 to about 8:1.

Clause 9. The method of any of Clauses 1 to 8, further comprising introducing the co-catalyst with the $C_4$-$C_{20}$ alpha-olefin monomer at a temperature of the $C_4$-$C_{20}$ alpha-olefin monomer of about −25° C. to about 0° C.

Clause 10. The method of any of Clauses 1 to 10, wherein the composition has a temperature of about −10° C. to about 40° C. for at least a portion of time when present in the first reaction vessel and the second reaction vessel.

Clause 11. The method of any of Clauses 1 to 10, wherein the first reaction vessel is fluidly coupled with the second reaction vessel via one or more conduits.

Clause 12. The method of any of Clauses 1 to 11, wherein transferring the composition from the first reaction vessel to the second reaction vessel is performed by increasing a flow of inert gas into the first reactor from a first flow rate to a second flow rate that is greater than the first flow rate.

Clause 13. The method of any of Clauses 1 to 12, wherein the transition metal halide is represented by the formula $MX_t$, wherein M is titanium or vanadium, t is 2, 3, or 4, and X is a halogen.

Clause 14. The method of any of Clauses 1 to 13, wherein the electron donor is selected from the group consisting of an ether, an ester, an amine, a phosphine, a piperidine, a phosphite, a phosphate, a pyridine, a sulfide, or combination(s) thereof.

Clause 15. The method of any of Clauses 1 to 14, wherein the co-catalyst is represented by the formula $AlR_nX_{3-n}$, wherein R is a hydrocarbyl having from 1 to 20 carbon atoms, X is halogen, siloxide, or alkoxide, and n is 1 or 2.

Clause 16. The method of any of Clauses 1 to 15, wherein the transition metal halide is $TiCl_3$, the electron donor is di-n-butyl ether, and the co-catalyst is diethyl aluminum chloride.

Clause 17. The method of any of Clauses 1 to 16, wherein the $C_4$-$C_{20}$ alpha-olefin monomer is a $C_8$-$C_{12}$ alpha-olefin monomer.

Clause 18. The method of any of Clauses 1 to 17, wherein the $C_8$-$C_{12}$ alpha-olefin monomer is 1-decene.

Clause 19. The method of any of Clauses 1 to 198, wherein the composition has a transition metal content of about 75 ppm to about 125 ppm.

Clause 20. The method of any of Clauses 1 to 19, wherein the composition in the second reaction vessel has 80 wt % or greater content of poly alpha-olefin @ 8 days of total polymerization, wherein the poly alpha-olefin has an average molecular weight of 15,000,000 or greater.

Clause 21. A poly alpha-olefin, comprising:
$C_4$-$C_{20}$ alpha-olefin monomeric units, the poly alpha-olefin having an intrinsic viscosity of about 20 dL/g or greater.

Clause 22. The poly alpha-olefin of Clause 21, wherein the $C_4$-$C_{20}$ alpha olefin monomeric units comprise $C_8$-$C_{12}$ alpha olefin monomeric units.

Clause 23. The poly alpha-olefin of any of Clauses 21 or 22, wherein the $C_8$-$C_{12}$ alpha olefins are 1-decene.

Clause 24. The poly alpha-olefin of claim 21, wherein the poly alpha-olefin has 90 wt % or greater $C_4$-$C_{20}$ alpha-olefin monomeric units that are 1-octene, 1-decene, 1-dodecene, or combination(s) thereof.

Clause 25. The poly alpha-olefin of any of Clauses 21 to 24, wherein the poly alpha-olefin has 95 wt % or greater monomeric units that are 1-decene.

Clause 26. The poly alpha-olefin of any of Clauses 21 to 25, wherein the poly alpha-olefin has an intrinsic viscosity of about 30 dL/g to about 40 dL/g.

Clause 27. The poly alpha-olefin of any of Clauses 21 to 26, wherein the poly alpha-olefin has an average molecular weight of about 18 million to about 25 million.

Clause 28. The poly alpha-olefin of any of Clauses 21 to 27, wherein the poly alpha-olefin is configured to reduce drag in a pipe with hydrocarbon flowing therethrough at a % drag reduction of about 55% or greater.

Clause 29. A coated poly alpha-olefin, comprising:
a poly alpha-olefin comprising $C_4$-$C_{20}$ alpha-olefin monomeric units, the poly alpha-olefin having an intrinsic viscosity of about 20 dL/g or greater; and
a coating disposed on the poly alpha-olefin, the coating comprising a partitioning agent.

Clause 30. The coated poly alpha-olefin of Clause 29, wherein the coated polyolefin has:
a content of the partitioning agent of about 15 wt % to about 20 wt %, based on the weight of the poly alpha-olefin+the partitioning agent, and a content of the poly alpha-olefin of about 75 wt % to about 80 wt %, based on the weight
of poly alpha-olefin+partitioning agent of the coated poly alpha-olefin.

Clause 31. The coated poly alpha-olefin of Clauses 29 or 30, wherein the partitioning agent is calcium stearate or magnesium stearate.

Clause 32. The coated poly alpha-olefin of any of Clauses 29 to 31, wherein the poly alpha-olefin has 90 wt % or greater $C_4$-$C_{20}$ alpha-olefin monomeric units that are 1-octene, 1-decene, 1-dodecene, or combination(s) thereof.

Clause 33. The coated poly alpha-olefin of any of Clauses 29 to 32, wherein the poly alpha-olefin has 95 wt % or greater monomeric units that are 1-decene.

Clause 34. A composition, comprising:
the coated poly alpha-olefin of any of Clauses 29 to 33; and
an inert carrier.

Clause 35. The composition of Clause 34, wherein the inert carrier is an oil.

Clause 36. The composition of Clauses 34 or 35, wherein the oil is a soybean oil.

Clause 37. The composition of any of Clauses 34 to 36, wherein the composition has:
a content of the coated poly alpha-olefin of about 35 wt % to about 50 wt %, based on weight of the composition; and
a content of the inert carrier of about 50 wt % to about 65 wt %, based on weight of the composition.

Clause 38. The composition of any of Clauses 34 to 37, wherein the composition is configured to reduce drag in a pipe with hydrocarbon flowing therethrough at a % drag reduction of about 55% or greater.

Overall, the present disclosure provides improved poly alpha-olefins, methods of making poly alpha-olefins, and compositions including the poly alpha-olefins. It has been discovered that (1) agitating for a period of time in the first reactor builds viscosity of the composition of the first reactor so the catalyst does not settle once the composition is then transferred to a second reaction vessel, and (2) the dimensions (e.g., height, width, length) of the second reaction vessel prevents the catalyst from settling in the second reaction vessel. Such conditions can provide ultra-high molecular weight poly alpha-olefins formed at very fast rate of reaction and having advantageous properties, e.g., when used as a drag reducing agent. In addition to providing new and improved poly alpha-olefins, methods of the present disclosure provide increased manufacturing throughput of ultra-high molecular weight poly alpha-olefins. For example, conventional polymerizations of high molecular weight poly alpha-olefins requires 30 days or more under conventional polymerization conditions, whereas polymerization of ultra-high molecular weight poly alpha-olefins of the present disclosure may be accomplished in about 15 days or less. In addition, product compositions of the present disclosure may have a higher content of poly alpha-olefin, as compared to conventional compositions, providing improved economics of transportation and handling of product compositions of the present disclosure. As used herein, a "composition" can include the components of the composition and/or reaction product(s) of two or more of the components of the composition.

Although end uses described herein relate to drag reduction in pipelines, it is to be understood that poly alpha-olefins, coated poly alpha-olefins, and product compositions of the present disclosure can be used in any other suitable end use application.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As is apparent from the foregoing general description and the specific embodiments, while forms of the present disclosure have been illustrated and described, various modifications can be made without departing from the spirit and scope of the present disclosure. Accordingly, the present disclosure be limited thereby. Likewise, whenever a composition, an element or a group of elements is preceded with the transitional phrase "comprising," it is further contemplated that the same composition or group of elements with transitional phrases "consisting essentially of," "consisting of," "selected from the group of consisting of," or "is" preceding the recitation of the composition, element, or elements and vice versa may be used.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A method for making a poly alpha-olefin, comprising:
agitating in a first reaction vessel for about 30 seconds or greater a composition comprising a transition metal halide, an electron donor, a co-catalyst, and a $C_4$-$C_{20}$ alpha-olefin to disperse the transition metal halide in the composition and carry out polymerization of the poly alpha-olefin to increase viscosity of the composition, wherein the first reaction vessel is a stirred tank reactor; and
transferring the composition from the first reaction vessel to a second reaction vessel that does not agitate the composition, wherein the composition has a viscosity of about 3 cP or greater during the transferring.

2. The method of claim 1, wherein agitating the composition is performed for about 6 minutes to about 11 minutes before transferring the composition to the second reaction vessel.

3. The method of claim 2, wherein agitating the composition is performed for about 7.5 minutes to about 8.5 minutes.

4. The method of claim 1, wherein the viscosity of the composition transferred to the second reaction vessel prevents the transition metal halide from settling in the second reaction vessel.

5. The method of claim 1, wherein the second reaction vessel is a bag comprising polyethylene terephthalate.

6. The method of claim 1, wherein the second reaction vessel has:
a length of about 10 ft to about 20 ft,
a width of about 1 ft to about 5 ft, and
a height of about 0.1 ft to about 2 ft.

7. The method of claim 1, wherein the second reaction vessel has:
a ratio of length to width of about 3:1 to about 8:1,
a ratio of length to height of about 20:1 to about 40:1, and
a ratio of width to height of about 3:1 to about 8:1.

8. The method of claim 1, wherein the composition has a temperature of about −10° C. to about 40° C. for at least a portion of time when present in the first reaction vessel and the second reaction vessel.

9. The method of claim 1, wherein the first reaction vessel is fluidly coupled with the second reaction vessel via one or more conduits.

10. The method of claim 9, wherein transferring the composition from the first reaction vessel to the second reaction vessel is performed by increasing a flow of inert gas into the first reactor from a first flow rate to a second flow rate that is greater than the first flow rate.

11. The method of claim 1, wherein the transition metal halide is represented by the formula $MX_t$, wherein M is titanium or vanadium, t is 2, 3, or 4, and X is a halogen.

12. The method of claim 1, wherein the electron donor is selected from the group consisting of an ether, an ester, an amine, a phosphine, a piperidine, a phosphite, a phosphate, a pyridine, a sulfide, or combination(s) thereof.

13. The method of claim 1, wherein the co-catalyst is represented by the formula $AlR_nX_{3-n}$, wherein R is a hydrocarbyl having from 1 to 20 carbon atoms, X is halogen, siloxide, or alkoxide, and n is 1 or 2.

14. The method of claim 1, wherein the transition metal halide is $TiCl_3$, the electron donor is di-n-butyl ether, and the co-catalyst is diethyl aluminum chloride.

15. The method of claim 1, wherein the $C_4$-$C_{20}$ alpha-olefin monomer is a $C_8$-$C_{12}$ alpha-olefin monomer.

16. The method of claim 15, wherein the $C_8$-$C_{12}$ alpha-olefin monomer is 1-decene.

17. The method of claim 1, wherein the composition has a transition metal content of about 75 ppm to about 125 ppm.

18. The method of claim 1, wherein the composition in the second reaction vessel has 80 wt % or greater content of poly alpha-olefin in about 8 days of total polymerization, wherein the poly alpha-olefin has an average molecular weight of 15,000,000 or greater.

19. A method for making a poly alpha-olefin, comprising:
agitating in a first reaction vessel a composition comprising a transition metal halide, an electron donor, a co-catalyst, and a $C_4$-$C_{20}$ alpha-olefin, wherein the first reaction vessel is a stirred tank reactor; and
transferring the composition from the first reaction vessel to a second reaction vessel, wherein the composition has a viscosity of about 1 cP or greater during the transferring.

20. The method of claim 19, wherein the viscosity is about 3 cP or greater.

* * * * *